United States Patent [19]
Zoggia

[11] Patent Number: 5,825,566
[45] Date of Patent: *Oct. 20, 1998

[54] METHOD FOR PRODUCING AND/OR CONTROLLING CHROMATIC LUMINOUS BEAMS APPLICABLE ON LIGHT PROJECTORS AND/OR OBSERVING AND MEASURING INSTRUMENTS OR THE LIKE

[75] Inventor: Antonio Zoggia, Mestrino, Italy

[73] Assignee: Ingenia S.r.L., Verona, Italy

[*] Notice: The term of this patent shall not extend beyond the expiration date of Pat. No. 5,640,226.

[21] Appl. No.: 595,815

[22] Filed: Feb. 2, 1996

[51] Int. Cl.⁶ .............................. G02B 5/22; G03B 7/32
[52] U.S. Cl. .............................. 359/889; 359/891; 355/32
[58] Field of Search ..................... 359/885, 891, 359/892, 889; 349/54; 355/32, 34; 352/84

[56] References Cited

U.S. PATENT DOCUMENTS

| | | | |
|---|---|---|---|
| 4,758,075 | 7/1988 | Hatano | 359/891 |
| 5,283,697 | 2/1994 | Tutt et al. | 359/885 |
| 5,345,340 | 9/1994 | Goedert | 359/885 |
| 5,633,737 | 5/1997 | Tanaka et al. | 349/5 |
| 5,640,226 | 6/1997 | Zoggia | 355/32 |

*Primary Examiner*—Jon W. Henry
*Assistant Examiner*—Audrey Chang
*Attorney, Agent, or Firm*—Notaro & Michalos P.C.

[57] ABSTRACT

A method for producing a luminous beam uses a chromatic element which can be shifted with respect to the beam axis. The chromatic element is arranged in a precise point inside the optical equipment for which the element is designed. The chromatic element or filter is arranged in an optical zone called the "pupil" and consists of plurality of circular sectors which are equal to each other, for instance each sector may occupy 120 degrees. The sectors each have different colors. The so-obtained filter is thus positioned in the pupil zone in such a way that the filter may be shifted orthogonally to the optical axis in order to choose and/or use or select an infinite range of colors or chromatic or luminous intensities.

2 Claims, 3 Drawing Sheets

METHOD FOR PRODUCING AND/OR CONTROLLING CHROMATIC LUMINOUS BEAMS APPLICABLE ON LIGHT PROJECTORS AND/OR OBSERVING AND MEASURING INSTRUMENTS OR THE LIKE

FIELD AND BACKGROUND OF THE INVENTION

The present patent for industrial invention refers to a method for producing and/or controlling chromatic luminous beams. According to an embodiment, the present method is applicable on light projectors carried out for various purposes and for different uses.

According to other embodiments, the present method may be applied to instruments for observing, surveying or measuring objects or phenomena relating to the field of art or science.

According to the known art, the production or reception of chromatic luminous beams may be obtained by means of several technological solutions and is utilized in various fields. For instance, the production of chromatic luminous beams is utilized in the fields of photography, lithography, cinematography and illumination engineering, in the theatre or in the places of amusement, namely, in any place in which it is necessary to vary and control the composition and decomposition of light while the reception of light may be utilized in various fields of science or art, for instance in any observing and measuring instruments based on luminous phenomena or radiations, both infrared radiations and ultraviolet radiations.

For instance, it is necessary to decompose a lithographic image in a monochromatic way in order to print it. Then, the image is reset mechanically in the inking print process "colour on colour". In the same way, it is necessary to super-impose chromatic filters in order to produce luminous beams in the theatres, discotheques, or other places of amusement, or for using special optical instruments such as microscopes or the like. In this way, it is possible to obtain the wished colour variations in the place in question.

The sector for the reception of the luminous beams is adjusted on the contrary by using neutral greys. This happens in the telemeters, in the measuring in other fields of frequencies in keeping with the optical principles, in the division of laser light beams, in the systems for controlling the focusing, and so on.

The general principle on which the art of colour photography is based consists in the fact that it is possible to reproduce with a sufficient fidelity almost all the natural colours by mixing only three colours, the so-called primary colours, which must be chosen suitably. In the phase of reproduction or print, the image is projected on sensitive supports by a light beam which has been previously coloured by means of suitable filters having different chromatic intensities. Such sensitive supports are developed in a suitable way and permit a true reproduction of the natural colours taken.

In the same way, in the field of illumination engineering it is necessary to insert suitable coloured filters of different intensities in a projector for projecting coloured light beams. The sum of such filters permits to obtain the wished colour projection.

The above mentioned systems for generating and receiving luminous beams are very disadvantageous since different sets of chromatic or neutral filters must be inserted in the various light projectors or receivers each time in order to obtain a particular colour in the first case, such a colour being obtained by the chromatic sum of the filters, and a measuring or survey system in the second case, such a system being based on the decomposition of the more or less visible luminous waves.

Of course, all the above described inconveniences give rise to considerable troubles especially in connection with the need of having many coloured filters of various luminous intensities, such intensities being always referred to the primary colours, and in connection with the need of programming and insert automatically in the instrument the filters to be used each time.

The same applicant has conceived, carried out and filed with Serial No. M093A000091 on 16th Jul. 1993 a method applicable in the colour photographic print based on a study of the image inversion zone, or "pupil" zone, that is on the circumstance according to which instead of inserting different filters each time between the luminous source and the negative or positive in the projector, it is sufficient to position just one filter, such a filter being carried out in a particular way. In fact, this filter is divided into more sectors showing a different chromatisms and is positioned precisely in the zone of the optical pupil. Accordingly, it is sufficient to shift this filter in a predetermined way, namely, orthogonally to the optical axis, in order to obtain the percentages required for a predetermined colour photographic print.

The aim of the present invention consists in applying substantially the same method to all the above described fields and other ones in which it is necessary to manipulate filters or the like in the "pupil" point of an optical system and to permit any wished colour or survey, study and observation of the light or luminous phenomena and their applications by means of an only chromatic element which is suitably carried out and arranged in a precise point in the inner part of an instrument for which such an element is designed, there being the possibility of shifting the chromatic element with simple calculated and/or programmed displacements.

SUMMARY OF THE INVENTION

Within the above mentioned general aim, the present invention proposes also that the method in question may be applied to very numerous solutions and uses, both in the field of science and in the field of art or illumination engineering with considerable practical and economical advantages.

In fact, the invention refers to a method for producing and/or controlling chromatic luminous beams, such a method being applicable for instance to projectors or the like, or instruments for observing or measuring the light or other similar instruments, and more precisely, the invention is to be applied in the optical assembly of such instruments, characterized in that it provides and element or filter which is positioned in the said optical assembly and more precisely, in the optical zone called "pupil", such element or filter being able to move orthogonally to the optical axis on permitting thus the conditions for controlling the colours used; the said filter consists of more circular sectors equal to each other but with different colours and/or intensities; the different colours of the said circular sectors are chosen preferably among the primary colours, for instance the colours based on the principle of the subtractive or additive synthesis or other similar systems for producing light, or according to different principles for measuring the light and/or electromagnetic waves for receiving, measuring or observing, for the light itself or various subjects or phenomena, in the field of science or technics.

Further characteristics and details of the present invention will be better understood from the following description of a preferred embodiment of the method in question, represented as an example not limiting the invention in the accompanying drawings in which:

DESCRIPTION OF THE PREFERRED EMBODIMENT

Figure 1:
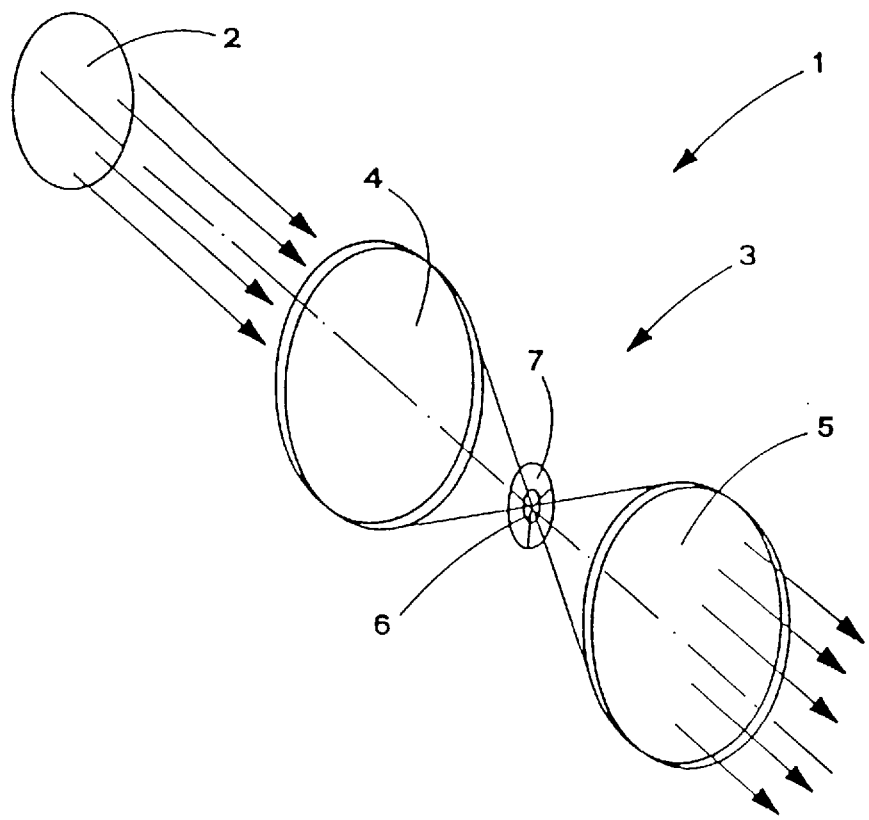
FIG. 1 shows a schematical view of an example of optical assembly according to a solution for producing a coloured luminous beam.

With reference to the accompanying drawings, and precisely to FIG. 1, number 1 indicates a light projector according to the present invention on the whole schematically. This light projector 1 consists in general of a luminous source 2, which may be for instance a conventional lamp, and an optical assembly 3.

The optical assembly 3 is carried out according to the present standard and may comprise two light condensers 4 and 5 in addition to the various sets of lenses. The point at which the beam inversion takes place is the pupil 6 which is arranged between the condenser 4 and the condenser 5.

The peculiarity of the present invention consists in arranging a particular element 7 or filter exactly in the point where there is the pupil 6, such an element or filter being formed by more circular sectors showing different colours. For instance, each sector may occupy 120 degrees. All the sectors form together a chromatic disk.

According to the present knowledge of light production, the filter 7 may comprise the colours yellow, magenta and cyan, blue, green and red in order to satisfy whatever need.

The so-obtained filter 7 is positioned in the pupil in such way that the filter 7 may accomplish movements orthogonally to the optical axis.

The possibility of displacing the filter 7 permits to choose and select an infinite range of colours or chromatic intensities although the primary colours are only three. If the filter 7 is positioned in the exact centre of the optical axis, the colour of the luminous emission corresponds to the sum of the three primary colours. If the filter 7 is moved to a certain extent, the colour of the luminous emission is prevalently the colour occupying more place in the pupil zone or an only colour.

This solution may be applied to numerous fields of the chromatic selection of image, for instance, besides the photographic print, this solution may be used in the telecameras, in the silk-screen processes, in the photocopying machines, in the motion-picture projectors.

Moreover, this solution may be used for the chromatic selection Of the luminous beam, for instance in the illumination engineering, in particular optical systems for safety closures, in special optical instruments such as microscopes, in video systems.

The same system may be applied to the light reception, for instance for observing, measuring or subdividing the light in science and technics.

Figure 2:
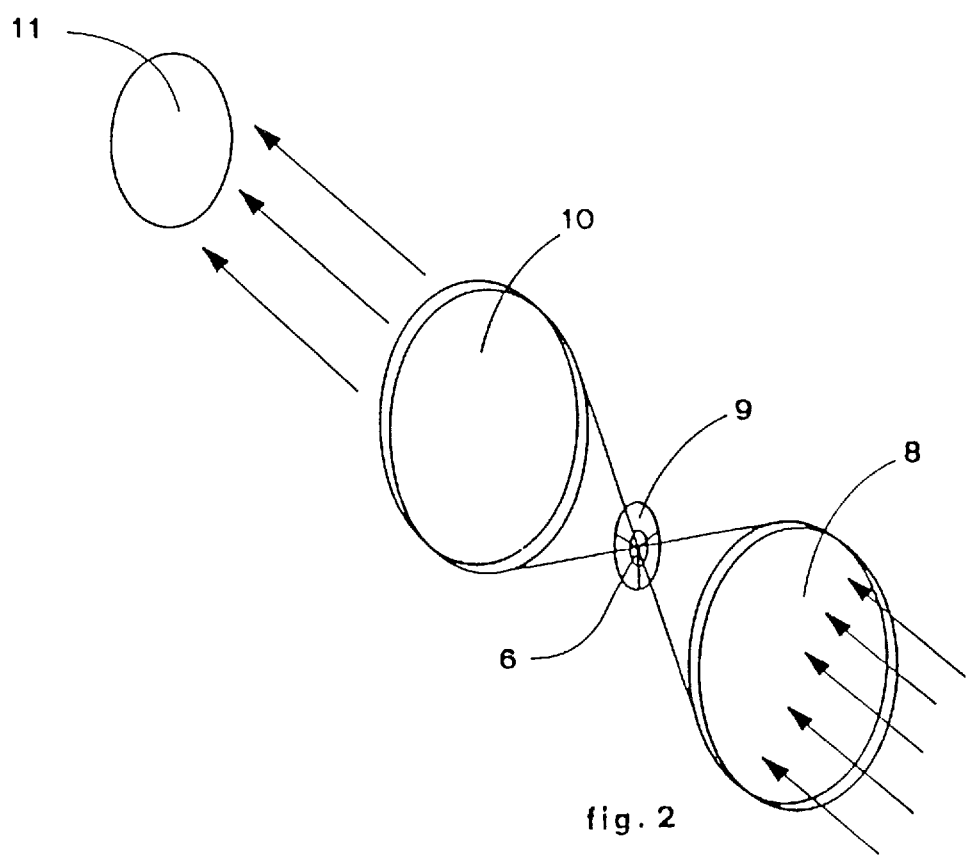
FIG. 2 shows a schematical view of an example of optical detector to be used for measuring o studying phenomena or technical-scientific subjects.
Figure 3:
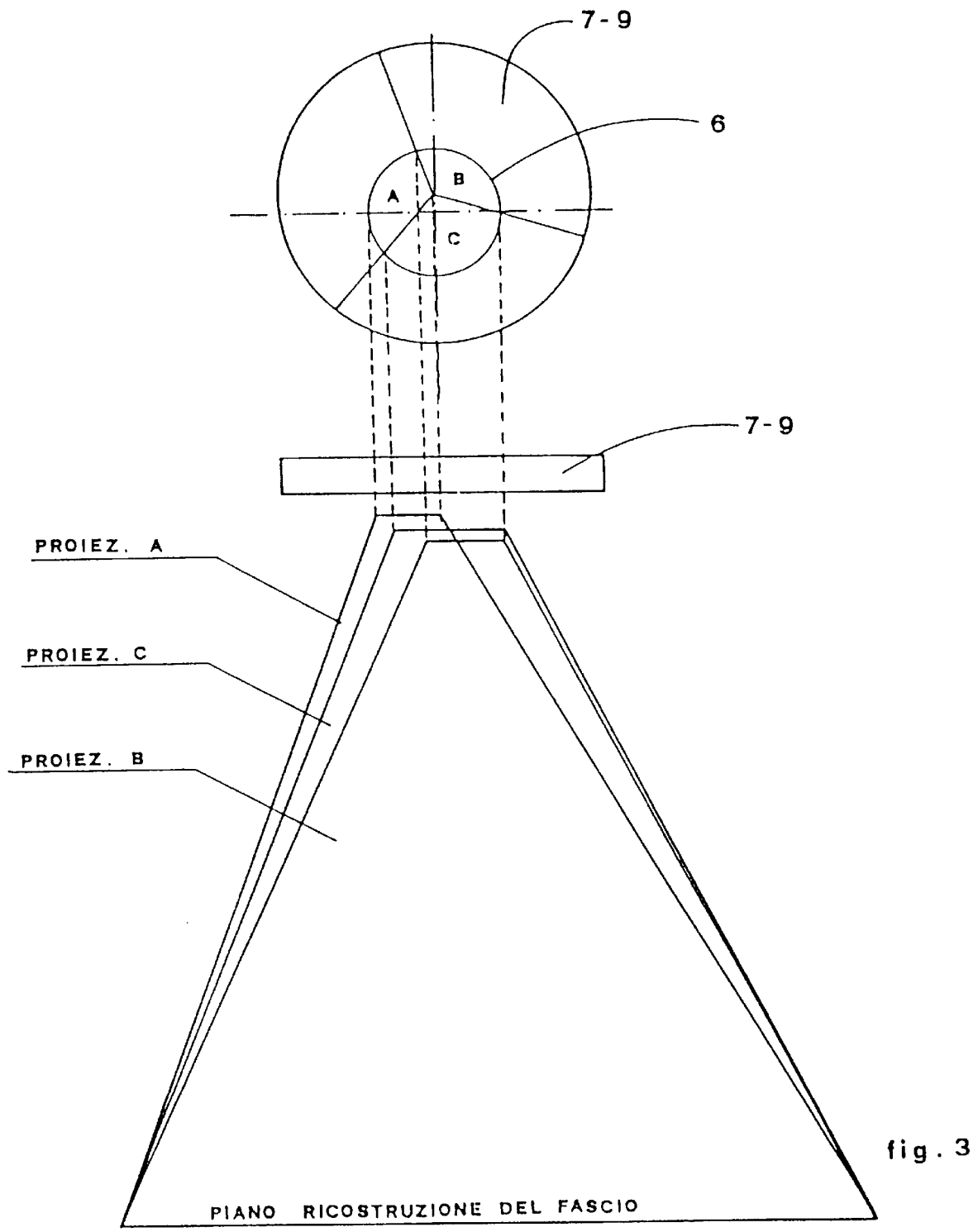
FIG. 3 shows a schematical view from which it appears the principle for the production or reception of luminous beams.

In FIG. 2, a diagram shows how it is possible to utilize the principle of the chromatic subdivision of the pupil in such sectors.

The instrument represented schematically in FIG. 2 receives the light to be analysed or measured through a front lens 8 instead of emitting coloured light as in the above described solution. The front lens 8 converges the light itself to the pupil where a filter 9 is positioned, such filter 9 being subdivided in sectors. Then, the filtered light is observed or measured from a rear lens 10 by means of a suitable instrument 11 for surveying or observing or measuring.

The above described instrument may be used for instance for a progressive measurement of the neutral greys, or in the telemeters, or for the measurement in other fields of frequencies corresponding to the optical principles, or in the subdivision of beams of laser light or in the control systems for focusing.

Figure 4:
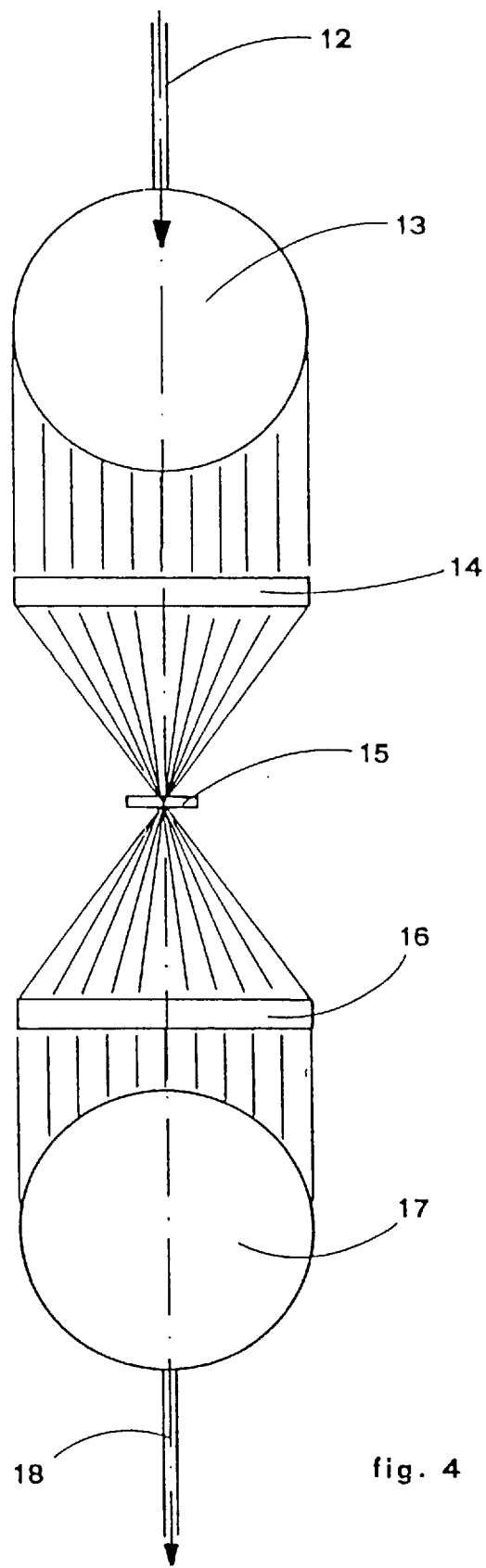
FIG. 4 shows a schematical view of a possible use of the method according to the present invention, namely, the manipulation of a laser beam.

In FIG. 4, a diagram shows how it is possible to make use of the method according to the present invention in the manipulation of a laser beam. In this figure, a beam 12 of laser light to be manipulated is enlarged by an optical body 13 and reaches an optical condenser 14 for the convergency. Then, from the optical condenser 14 the beam 12 goes in the inversion zone 15 where the beam is reversed through the filter. Then, the enlarged laser beam passes through an optical divergent condenser 16 and is projected on a last optical contracting body 17. The output laser beam 18 is thus a manipulated beam.

Of course, the above described method may be used in further several applications based on the same method of composition or decomposition of light in the zone of the "pupil" in optical instruments or devices for luminous emissions or for observing or measuring or surveying subjects or phenomena of various nature, all such applications being to be considered as included in the range of protection of the present invention.

I claim:

1. An apparatus for continuously and uniformly modifying a color composition of a light beam, consisting essentially of:

lens means for focusing one light beam along an optical axis and for forming an image inversion point along the optical axis;

a filter having a plurality of different colored segments extending outwardly from a common point on the filter, the filter being disposed substantially at the inversion point and across the optical axis; and means for moving the filter orthogonally with respect to the optical axis for offsetting the common point of the filter from the optical axis in selected directions and by selected amounts, so that surface areas of each filter segment through which the light beam passes are adjusted to continuously and uniformly modify the color of the light beam.

2. A method for continuously and uniformly modifying the color composition of a light beam comprising the steps of:

focusing a light beam along an optical axis and forming an image inversion point along the optical axis;

positioning a filter substantially at said inversion point and across said optical axis, the filter having a plurality of different colored segments, said segments all extending outwardly from a common point on the filter; and aligning the filter for offsetting the common point on the filter from the optical axis in selected directions and by selected amounts so that surface areas of each filter segments through which the light beam passes are adjusted for continuously and uniformly modifying the color of the light beam.

* * * * *